(Model.)

S. H. HAMILTON.
MANUFACTURE OF PAPER BOARD.

No. 269,785. Patented Dec. 26, 1882.

Witnesses.
Jas. E. Hutchinson
Henry C. Hazard

Inventor.
S. H. Hamilton, by
Geo. S. Prindle, his Atty

UNITED STATES PATENT OFFICE.

SILAS H. HAMILTON, OF LAWRENCE, KANSAS, ASSIGNOR, BY MESNE ASSIGNMENTS, TO MARVIN A. FARR, OF CHICAGO, ILLINOIS.

MANUFACTURE OF PAPER-BOARD.

SPECIFICATION forming part of Letters Patent No. 269,785, dated December 26, 1882.

Application filed April 5, 1881. Renewed October 24, 1881. (Model.)

*To all whom it may concern:*

Be it known that I, SILAS H. HAMILTON, of Lawrence, in the county of Douglas, and in the State of Kansas, have invented certain new and useful Improvements in the Manufacture of Paper-Board; and I do hereby declare that the following is a full, clear, and exact description thereof, reference being had to the accompanying drawings, making a part of this specification, in which—

Figure 1:
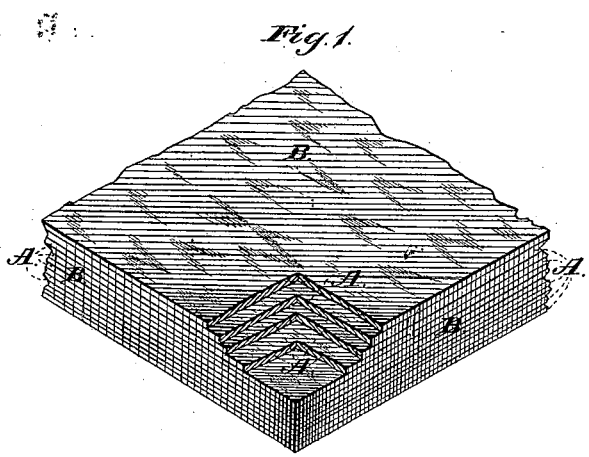
Figure 2:
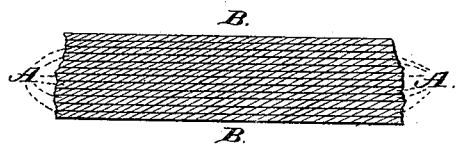

Figure 1 is a perspective view of my improved board, a portion of one edge being broken to show the manner of combining the sheets; and Fig. 2 is a cross-section of the same.

Letters of like name and kind refer to like parts in each of the figures.

The design of my invention is to render practicable the employment of paper for purposes to which wood, metal, or stone have heretofore been applied; and to this end it consists in an improved article of manufacture, composed of a board formed of several sheets of paper saturated with resin and oil, then coated with a solution of milk-curd and lime, and finally passed through heated pressure-rollers, substantially as and for the purpose hereinafter specified.

In the use of my invention I take sheets of paper, A, preferably made from straw or cane, and pass the same through a heated solution of resin and oil, preferably linseed or paraffine, in the proportion of two hundred and eighty pounds of resin to two gallons of oil, after which said sheets are permitted to remain until dry. I next coat one side of each sheet A, except that intended for the lower side of the board, with a mixture of milk-curd and slaked lime in the proportion of three parts of milk-curd to one part of lime, after which said sheets are passed between heated rollers and subjected to a heavy pressure, which causes them to adhere together and to form a board, B, that has any desired thickness or size. After the board B has been formed, as described, it is placed within a press and subjected to a moderate pressure until thoroughly cool, when it is ready for use.

The board thus constructed is thoroughly homogeneous, is entirely unaffected by water or dampness, is in a great degree fire-proof, and possesses greater density, strength, and durability than is possessed by any of the woods ordinarily used for building purposes.

Having thus fully set forth the nature and merits of my invention, what I claim as new is—

An improved article of manufacture, consisting of a board composed of several sheets of paper saturated with resin and oil, then coated with a solution of milk-curd and lime, and finally passed through heated pressure-rollers, substantially as and for the purpose specified.

In testimony that I claim the foregoing I have hereunto set my hand this 4th day of April, 1881.

SILAS H. HAMILTON.

Witnesses:
JAS. E. HUTCHINSON,
HENRY C. HAZARD.